United States Patent
Kahn et al.

(10) Patent No.: US 7,194,155 B1
(45) Date of Patent: Mar. 20, 2007

(54) ADAPTIVE CONTROL FOR MITIGATING INTERFERENCE IN A MULTIMODE TRANSMISSION MEDIUM

(75) Inventors: Joseph M. Kahn, San Carlos, CA (US); Mark A. Horowitz, Menlo Park, CA (US); Elad Alon, Stanford, CA (US); Vladimir M. Stojanovic, Lexington, MA (US)

(73) Assignees: The Board of Trustees of the Leland Stanford Junior University, Palo Alto, CA (US); Rambus Inc., Los Altos, CA (US)

( * ) Notice: Subject to any disclaimer, the term of this patent is extended or adjusted under 35 U.S.C. 154(b) by 0 days.

(21) Appl. No.: 11/201,404

(22) Filed: Aug. 10, 2005

Related U.S. Application Data

(60) Provisional application No. 60/600,298, filed on Aug. 10, 2004.

(51) Int. Cl.
 *G02B 6/26* (2006.01)
(52) U.S. Cl. .............................. 385/27; 385/31; 385/29
(58) Field of Classification Search ................. 385/31, 385/27, 29
 See application file for complete search history.

(56) References Cited

U.S. PATENT DOCUMENTS

2006/0051017 A1\* 3/2006 Hallemeier et al. ........... 385/28

OTHER PUBLICATIONS

Alon, E. et al. Eequalization of modal dispersion in multimode fiber using spatial light modulators, Global Telecommunications Conference, 2004. GLOBECOM '04, IEEE vol. 2, Nov. 29-Dec. 3, 2004 pp. 1023-1029.\*

I. Sharfer and A. O. Hero III, *A maximum likelihood digital receiver using coordinate ascent and the discrete wavelet transform*, IEEE Transactions on Signal Processing, vol. 47, No. 3, pp. 813-825, Mar. 1999.

S. S-H Yam et al. *40 Gb/s transmission over 140 m 62.5 μm multimode fiber using polarization controlled launch*. Optical Society of America, 2 pages, 2003.

\* cited by examiner

*Primary Examiner*—Sarah Song
(74) *Attorney, Agent, or Firm*—Crawford Maunu PLLC

(57) ABSTRACT

Optical data is processed and transmitted in a multimode transmission medium in a manner that facilitates the mitigation of interference such as that often referred to as intersymbol interference (ISI). According to an example embodiment of the present invention, a spatial light modulator is controlled to adaptively spatially filter light to be passed on a multimode transmission medium such as a multimode optical fiber.

26 Claims, 3 Drawing Sheets

ADAPTIVE CONTROL FOR MITIGATING INTERFERENCE IN A MULTIMODE TRANSMISSION MEDIUM

RELATED PATENT DOCUMENTS

This patent document claims benefit under 35 U.S.C. § 119(e) to U.S. Provisional Patent Application No. 60/600,298, entitled "Equalization of Modal Dispersion," filed on Aug. 10, 2004.

FIELD OF THE INVENTION

The present invention relates generally to optical systems, and more particularly to signal processing with multimode optical fibers.

BACKGROUND

Multimode optical fiber is a ubiquitous medium that is used with a variety of applications, such as with universities, schools, hospitals, businesses and factories. For instance, in local and campus area networks, multimode fiber (MMF) has often been favored over single-mode fiber (SMF) because of the low cost of fiber installation, fiber maintenance, and transceiver components. In this context, a "mode" generally refers to the characteristic of the propagation of light (e.g., through a waveguide) that can be designated by a radiation pattern in a plane transverse to the direction of travel. The term "single-mode fiber" (SMF) thus has been used to generally refer to a fiber that facilitates light propagation that is designated by a single light characteristic type (i.e., a single radiation pattern). The term "multi-mode fiber" (MMF) thus has been used to generally refer to a fiber that facilitates light propagation that is designated by two or more light characteristic types (i.e., two or more radiation patterns). In this regard, MMF refers to waveguides whose cores are large enough compared to the wavelength of the light that they support the existence of multiple distinct modes propagating at different group velocities.

From a practical standpoint, MMF has generally offered lower capacity than SMF. Transmission rates in MMF are limited by the propagation of multiple transverse modes at different group velocities; this may typically be referred to as modal dispersion, e.g., wherein a signal is spread in time due to different propagation velocities for different modes. SMF is typically free of this type of modal dispersion. Hence, in recent decades, research on SMF systems has far outstripped work on MMF systems. SMF systems can transport terabits per second over thousands of kilometers. However, MMF systems have typically been limited to a bit rate-distance product well below 10 Gb/s-km.

In some aspects, wireless channel communications are analogous to MMF communications. Multipath fading that occurs in wireless systems was traditionally viewed as a strictly deleterious phenomenon. Various techniques have been devised to overcome fading in single-input, single-output (SISO) links, including diversity and equalization, as well as multicarrier and spread spectrum modulation. In recent years, it has been realized that multipath fading actually creates additional spatial dimensions that can be exploited by multi-input, multi-output (MIMO) techniques to dramatically enhance wireless transmission capacity. The plurality of modes in MMF has traditionally been viewed as a strictly negative, bandwidth-limiting effect, and various techniques have been proposed to counter modal dispersion.

Various approaches for eliminating modal dispersion in SISO MMF links have been proposed. For example, multimode fibers with substantially low modal dispersion have been developed. Wavelength-division multiplexing (WDM) can be used to increase the aggregate bit rate (but is relatively high in cost). Various other techniques, including controlled launch, electrical equalization or subcarrier modulation can provide a relatively limited increase in bit rate-distance product associated with multimode fibers.

Among less conventional approaches, a segmented photodetector can be used to perform spatially resolved intensity detection. The photocurrents from the different segments can be processed using diversity combining and electrical equalization to mitigate the effect of modal dispersion. Another approach involves the use of diffractive optical elements to selectively excite one fiber mode in an attempt to reduce modal dispersion.

With approaches such as those described above, fixed spatial filtering is used to launch into one "mode," which is more precisely described as an eigenmode of an idealized round, straight fiber. In real fibers, random fabrication errors and bends lead to coupling between these ideal eigenmodes over distances of centimeters to meters. Hence, even if one launches into a single ideal eigenmode, substantial modal dispersion still occurs over transmission distances of practical interest, which are tens to thousands of meters. Furthermore, in the presence of modal coupling, slow changes in the fiber temperature and stress make modal dispersion time-varying, on a time scale typically of the order of seconds. It is interesting to note that while modern graded-index fibers have far less modal dispersion than older step-index fibers, the velocity matching in graded-index fibers actually enhances mode coupling, making it even more difficult to control modal dispersion by launching into one ideal eigenmode.

Over the years, several groups have proposed various approaches to MIMO transmission in MMF. For instance, it has been suggested to exploit multiple spatial degrees of freedom using angle multiplexing, i.e., by launching different information streams at different angles. While this approach has certain usefulness, it has generally failed because signals launched at different angles become cross-coupled after propagating a few meters in step-index or graded-index fibers.

The above and other difficulties continue to present challenges to the communication of information over fiber optic media.

SUMMARY

The present invention is directed to overcoming the above-mentioned challenges and others related to the types of devices and applications discussed above and in other applications. These and other aspects of the present invention are exemplified in a number of illustrated implementations and applications, some of which are shown in the figures and characterized in the claims section that follows.

Various aspects of the present invention are applicable to signal processing approaches that mitigate interference in optical communication links, such as SISO links. Other aspects of the present invention are applicable to approaches that facilitate MIMO transmission. Some of these aspects facilitate the exploitation of multiple spatial dimensions in MMF and multimode waveguides. In some instances, MIMO approaches address modal dispersion issues and facilitate multiplicative capacity gains using spatial multiplexing.

According to an example embodiment of the present invention, a spatial light modulator (SLM) controls the launched field pattern of light at an optical data transmitter. An estimate of intersymbol interference (ISI) at a receiver caused by modal dispersion is made and fed back to the transmitter. The transmitter uses the ISI estimate to operate the SLM, and where appropriate, adjust the operation of the SLM to minimize ISI.

In another example embodiment of the present invention, spatial light modulation (SLM) is implemented to equalize and/or mitigate modal dispersion in a multimode optical medium. In one implementation, the SLM approach involves adaptively processing light using a single-coordinate ascent algorithm. In another implementation, the SLM approach involves processing light using a semidefinite program (SDP)-based heuristic. These approaches facilitate the focusing of light into a selected mode for an optical communications medium, thereby mitigating and/or eliminating interference in the optical communications medium.

According to another example embodiment of the present invention, an optical transmission system is adapted for transmitting light using spatial light modulation to equalize and/or mitigate modal dispersion. The system includes a multimode fiber optic medium (e.g., a waveguide) adapted to pass optical information. A transmitter is adapted to transmit light via the multimode fiber optic medium and a receiver is adapted to receive light transmitted via the multimode fiber optic medium. A spatial filter is adapted to mitigate modal dispersion in optical signals conveyed in the multimode fiber optic medium using a single-coordinate ascent algorithm.

In another example embodiment of the present invention, an optical transmitter transmits light in a multi-mode transmission medium. The optical transmitter includes a spatial light modulator that performs spatial filtering and a spatial light modulation controller that adaptively controls the spatial light modulator. The adaptive control is implemented to mitigate interference in the multi-mode transmission medium. In some applications, the spatial light modulator is adaptively controlled to arrive at and fix a spatial filter setting for a particular application, with the fixed setting used for transmission of light over the multi-mode transmission medium for the applications.

According to another example embodiment of the present invention, an optical data transmission arrangement transmits data in the form of light in a multi-mode transmission medium. A spatial light modulation arrangement (e.g., a spatial light modulator, and where appropriate, supporting components) performs spatial filtering on electric fields of the light at the direction of a spatial light modulation controller. The controller implements an adaptive algorithm in controlling the spatial light modulation arrangement to mitigate interference in the multi-mode transmission medium. The controller uses an objective parameter, which is indicative of the interference, with the adaptive algorithm to mitigate excitation of undesired modes of the light.

In another example embodiment of the present invention, light is transmitted in a multi-mode transmission medium using a spatial light modulator to spatially filter the light. The spatial light modulator arrangement is controlled adaptively to mitigate interference in the multi-mode transmission medium.

An optical communication system communicates light in a multi-mode transmission medium in connection with another example embodiment of the present invention. The system includes a transmitter having a spatial light modulator that performs spatial filtering, and a spatial light modulation controller that controls the spatial light modulator adaptively, therein mitigating interference in the multi-mode transmission medium. The system also includes a receiver having a photo-detector adapted to receive the light. In some applications, the receiver provides a feedback signal to the transmitter, and the spatial light modulation controller uses the feedback signal in controlling the spatial light modulator.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
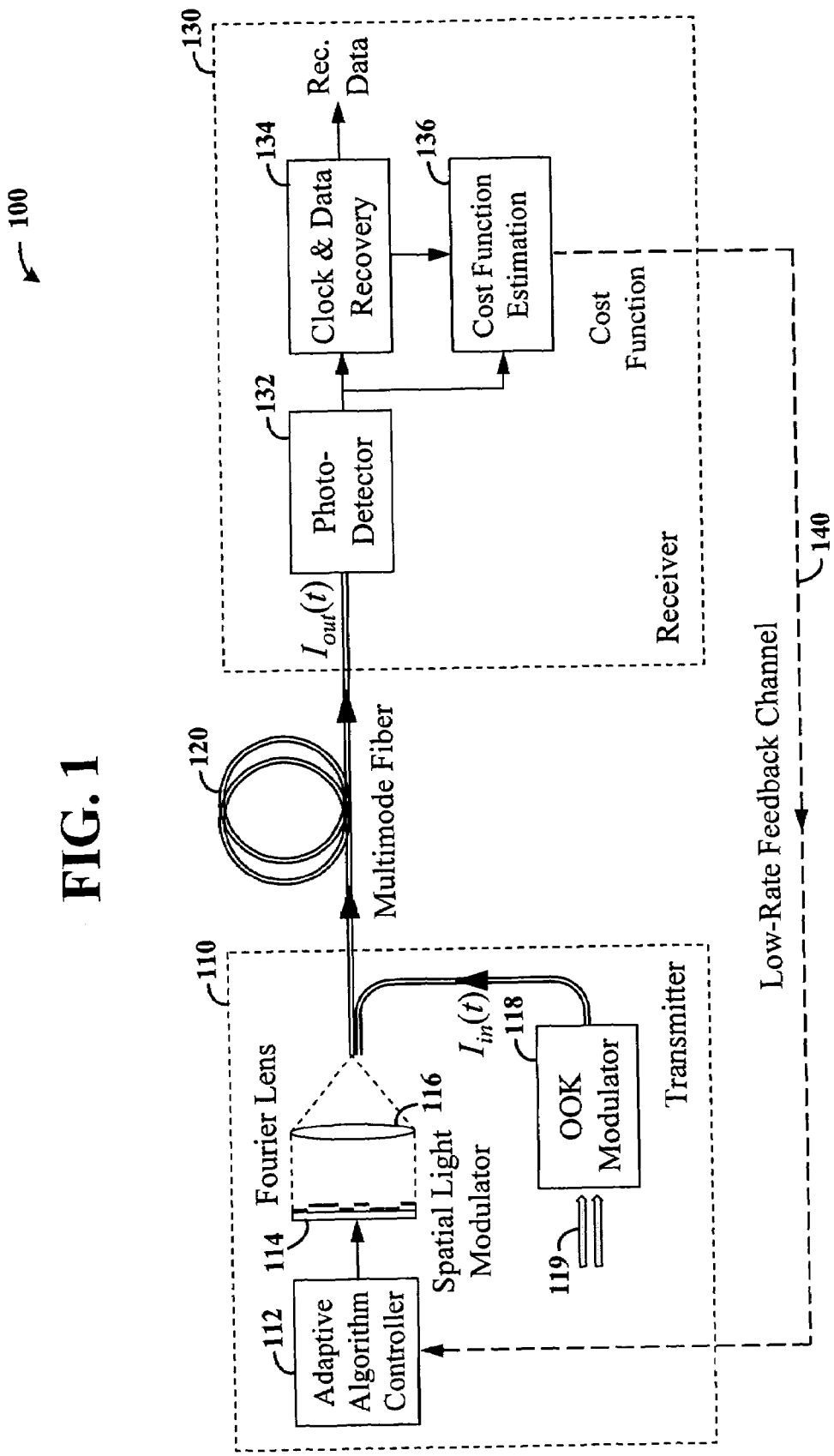
FIG. 1 shows a system for processing light for transmission, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different types of communications, and the invention has been found to be particularly suited for communicating information over optical fiber. While the present invention is not necessarily limited to such applications, various aspects of the invention may be appreciated through a discussion of various examples using this context.

In connection with an example embodiment of the present invention, a light signal is focused into selected modes to mitigate interference (e.g., as associated with modal dispersion) when the light signal is transmitted on an optical fiber. For instance, an optical data signal can be focused, or passed, into modes of a particular fiber over which the signal is to be transmitted in a manner that mitigates or eliminates intersymbol interference (ISI). With this approach, modal dispersion (the spread of a signal in time due to different velocities in different modes) is addressed by selectively focusing the light into a selected mode or modes for an optical fiber. Furthermore, this approach is selectively implemented without necessarily amplifying fixed noise in the system used to transmit the optical data signal.

Various example embodiments are directed to the selection of spatial light modulation (SLM) pixel settings (i.e., to selectively pass spatial frequencies of light) to be used in connection with the above-discussed refocusing approach. In some implementations, a single-coordinate ascent (SCA)

algorithm is used to implement SLM to spatially filter an optical data signal. In other implementations, a SDP-based heuristic is used to implement SLM in spatially filtering an optical data signal for transmission, independently or in connection with the SCA approach (e.g., to set upper bounds on target conditions for the SCA approach).

For more information regarding light processing in general, and for specific information regarding light processing approaches involving the mitigation of interference in a multimode waveguide as may be applicable in connection with one or more example embodiments herein, reference may be made to the above-referenced underlying provisional patent document.

Turning now to the figures, FIG. 1 shows a system 100 for processing light for transmission, according to another example embodiment of the present invention. The system 100 includes a transmitter arrangement 110 adapted to transmit optical information via a multimode fiber (MMF) 120 to a receiver arrangement 130. A feedback channel 140, shown here as a low-rate feedback channel but implementable using a variety of feedback approaches, provides feedback from the receiver arrangement 130 to the transmitter arrangement 110. The feedback is used by the transmitter arrangement 110 to control the spatial filtering of light launched into the MMF 120. The transmitter arrangement 110 is selectively implemented with a variety of arrangements, such as with receiver arrangements that are different than the shown receiver arrangement 130, with feedback provided to the transmitter arrangement 110 in one or more of a variety of manners.

The transmitter arrangement 110 includes an adaptive algorithm controller 112 (e.g., implemented with a computer or processor), a spatial light modulator (SLM) 114, a Fourier lens arrangement 116 and an on-off keying (OOK) modulator 118. Light from a laser (e.g., transmission data) 119 is intensity modulated using the OOK modulator 118, with the output of the intensity-modulated laser light being represented by a modulated signal, $I_{in}(t)$. For general information regarding light transmission, and for specific information regarding approaches for light transmission over an optical fiber such as a MMF, reference may be made to S.S.-H. Yam, F.-T. An, S. Sinha, M. E. Marhic, L. G. Kazovsky, 40 *Gb/s transmission over* 140 *m* 62.5 *Fm multimode fiber using polarization controlled launch*, Proceedings of Conference on Laser and Electro-optics (CLEO 2004), San Francisco, Calif., CD-ROM, CTuEE5, May 2004. In some implementations, the OOK modulator 118 is implemented with a multilevel pulse-amplitude modulator that intensity modulates the laser light.

The modulated signal $I_{in}(t)$ is spatially Fourier-transformed with the Fourier lens arrangement 116 and directed to the SLM 114. The adaptive algorithm controller 112 uses feedback from the receiver arrangement 130 to operate the SLM 114 to mitigate intersymbol interference (ISI) by launching light into selected modes. In this regard, the SLM 114 implements an array of SLM pixels to manipulate the phase and/or amplitude of the light in the spatial frequency domain and passes the spatially-modulated (manipulated) light back to the Fourier lens arrangement 116. Certain approaches to implementing the array of SLM pixels are discussed in connection with other example embodiments herein, for example by selectively passing (reflecting) light at certain pixel locations in the SLM. The Fourier lens arrangement 116 spatially inverse Fourier-transforms light received from the SLM 114 and couples the transformed light into the MMF 120.

The receiver arrangement 130 includes a photodetector 132, a clock and data recovery arrangement 134 and a cost function estimation arrangement 136 (e.g., a programmed function). A light signal $I_{out}(t)$ from the MMF 120 is detected at a photodetector 132. This light signal $I_{out}(t)$ is generally commensurate with the light coupled into the MMF 120 via the Fourier lens arrangement 116, with variations associated with the transfer of the light over the MMF.

The clock and data recovery arrangement 134 processes the output of the photodetector 132 for use by the cost function estimation arrangement 136 and for generating a data output (for recording or otherwise processing data in the signal $I_{out}(t)$ received via the MMF 120). The cost function estimation arrangement 136 estimates the interference received in each symbol in the signal $I_{out}(t)$. This estimate is accumulated from several symbols to yield a cost function that facilitates the identification of, e.g., a condition relative to a signal to interference ratio for the signal $I_{out}(t)$. This cost function estimate relates to a usable minimum noise-free eye opening.

The cost function estimate is output from the cost function estimation arrangement 136 and fed back to the transmitter arrangement 110 via the low-rate feedback channel 140. The adaptive algorithm controller 112 uses the cost function estimation output to compute updates to pixel settings of the SLM 114, and therein mitigate interference in the MMF 120.

The arrangement 100 in FIG. 1 is applicable to a variety of communication approaches. For example, in some applications, the transmitter arrangement 110 and the receiver arrangement 130 are implemented at relatively distant locations, such as those coupled via the MMF 120 at a distance of several meters, kilometers or several thousand kilometers. In other applications, the transmitter arrangement 110 and the receiver arrangement 130 are implemented in relatively close locations, such as within a particular system. In one implementation, the transmitter arrangement 110 is located on a circuit chip and the receiver arrangement 130 on a different circuit chip, with both circuit chips being located in a common system such as a common computer or on a common circuit board.

Figure 2:
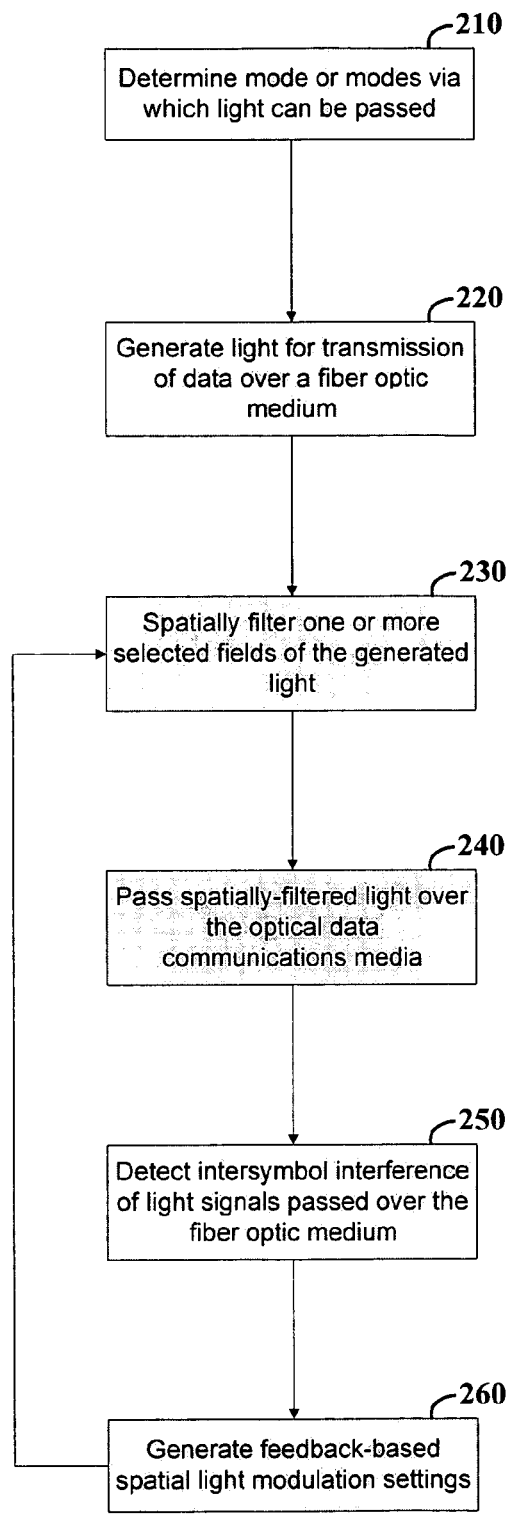
FIG. 2 is a flow diagram for an approach to mitigating modal dispersion in optical data communications, according to another example embodiment of the present invention.

FIG. 2 is a flow diagram for an approach to mitigating modal dispersion in optical data communication media, according to another example embodiment of the present invention. In this context (and as otherwise referred to in this document), the mitigation of modal dispersion involves the mitigation of interference in transmitted light. The approach shown in FIG. 2 may be implemented, for example, in connection with the system 100 in FIG. 1.

At block 210, a model of the optical data communication media is implemented with spatial light modulation settings to determine a mode or set of modes via which light can be passed while achieving a selected minimum limit on interference between symbols (i.e., achieving the mitigation of intersymbol interference). At block 220, a light source generates light for use in communicating data over the optical data communication media. At block 230, one or more selected fields of the light are spatially filtered in accordance with the spatial light modulation settings set at block 210, such that selected modes of the light (e.g., involving specific radiation patterns for light transmission over the optical data communication media) are passed. The spatially-filtered light is then passed over the optical data communication media at block 240.

Once the light is passed at block 240, intersymbol interference (ISI) at a receiving end of the optical data communications media is detected at block 250. At block 260, the detected ISI is used to generate feedback-based spatial light modulation settings. The spatial light modulation settings generated at block 260 are then used to spatially filter light at block 230 in sending additional optical data over the optical data communication media.

Several of the following example embodiments are directed to various approaches to the communication of light data. In some applications, these example embodiments are implemented in connection with one or more of the examples discussed above, shown in the figures or otherwise discussed in this patent document. In some instances, reference is made directly to certain figures or discussion thereof. In other instances, the discussion of the various embodiments does not necessarily reference the figures or discussion above, but is selectively applied thereto in connection with certain approaches.

According to another example embodiment of the present invention, a framework for optimization of an SLM approach is established using a model of an optical fiber channel as a function of the SLM settings. Such an approach may be implemented, for example, in connection with the adaptive algorithm controller 112 and the SLM 114 shown in and described in connection with FIG. 1. Physical constraints associated with the passive nature of the SLM are included in the optimization problem. An appropriate objective function is selected, with both the signal-to-interference ratio (SIR) and minimum distance between signal levels ($d_{min}$) being selected for implementation. The dual of the optimization problem is derived to facilitate the identification of upper bounds on achievable performance for a given fiber and SLM system. In some applications, the solution of the dual problem is used in a heuristic to find approaches to SLM settings that address the mitigation of modal dispersion by reaching or nearly reaching the identified upper bounds, associated with limiting interference.

In some example embodiments, an adaptive optimization/operational approach uses a single coordinate ascent (SCA) algorithm to address time-based changes of the modes and properties of a fiber via which light is passed. Such changes may be attributed to, for example, vibrations or temperature-induced geometric variations. The single coordinate ascent algorithm is implemented in a manner that approaches the upper bounds of achievable performance as discussed in the preceding paragraph, as defined using the dual optimization approach.

In certain implementations, the SCA algorithm approach is implemented to create a MIMO system over a single multimode fiber. Mathematically, the modes via which light propagates in the MMF are represented as a matrix ($\Psi$) where each column of the matrix is a mode sampled in the spatial frequency domain. The SLM settings, a vector in spatial frequency (x), set the field pattern of the light transmitted into the fiber. Since the modes of the fiber are orthogonal, the transmitted light is decomposed onto the basis of the fiber modes by a matrix projection ($\Psi^H x$). While this describes the portions of the electric field in each fiber mode, the receiver arrangement detects the field intensity. Therefore, the impulse response of the system as a function of the SLM settings is $$I_{out}(t) = x^H \Psi F(t) \Psi^H x \quad \text{(Equation 1)}$$

where F(t) is a diagonal matrix containing impulses delayed by the propagation delays of the modes. With this approach, the impulse response is a quadratic function of the SLM settings. Since the SLM is passive in nature, each component of x is a complex number with magnitude less than or equal to one. Where a phase-only SLM is implemented, each component of x is a real number between zero and one; the constraints for phase-only SLMs are that each component of x is a complex number whose magnitude is equal to one.

Using a dual optimization approach as discussed above, and implementing a channel model of a fiber and physical constraints of the SLM as described above, an objective function is chosen to facilitate both a peak signal-to-interference ratio (SIR) function and as well as the minimum margin between two intensity levels. The peak SIR can be reduced to a ratio of quadratic forms, referred to as $SIR_{/1}$.

A receiver is used to detect intensity while the SLM acts on the electric field of a signal. The symbol-spaced sampled pulse response of the system is determined in order to calculate a cost function (e.g., characterizing interference). At a particular symbol rate, this pulse response is calculated by summing together the intensities of the modes arriving at an end of the fiber within the same symbol interval. The group of modes (or a single mode) that arrive together to form the highest intensity sample of the pulse response can be selected by an indicator diagonal matrix $I_{\Delta main}$ as referenced in Equation 2A below. All the remaining modes, which arrive in other symbol periods and cause ISI, can be selected by a second diagonal matrix $I - I_{\Delta main}$ as referenced in Equation 2B below.

$$I_{out}^{main} = x^H \Psi I_{\Delta main} \Psi^H x \quad \text{(Equation 2A)}$$

$$I_{out}^{ISI} = x^H \Psi (I - I_{\Delta main}) \Psi^H x \quad \text{(Equation 2B)}$$

The peak SIR is simply the ratio of $I_{out}^{main}$ to $I_{out}^{ISI}$; this function resembles the standard SIR which can be used to minimize the bit error rate. Without constraints, the optimization problem with this objective function is $$\underset{x}{\text{maximize}}\ SIR_{/1} = \frac{x^H \Psi I_{\Delta main} \Psi^H x}{I_{out}^{ISI} = x^H \Psi (I - I_{\Delta main}) \Psi^H x}. \quad \text{(Equation 3)}$$

An objective function that is proportional to the received intensity is used to find energy-efficient SLM settings. Given that optical signals are often transmitted in binary NRZ format, an objective function that corresponds to the minimum distance between the received "0" and "1" symbols, $d_{min}$, is implemented. The unconstrained optimization problem with $d_{min}$ as the objective function becomes $$\underset{x}{\text{maximize}}\ d_{min} = x^H P x \quad \text{(Equation 4)}$$

$$\text{where}\ P = \Psi(2 I_{\Delta main} - I) \Psi^H.$$

Heuristics are then implemented to facilitate the inclusion of passivity constraints of the SLM as follows maximize $x^H P x$ subject to $|x_k| \leq 1,\ k=1, \ldots, N,\ x \in C^N.$ \quad (Equation 5)

In order to guide the development of these heuristics and obtain bounds on the achievable $d_{min}$, the dual of problem in Equation 5 is formulated. A Lagrangian for Equation 5 is formed as $$L(x, \lambda) = x^H (P + \text{diag}(\lambda) x - \lambda^T 1, \quad \text{(Equation 6)}$$

where $\lambda$ is the dual variable

Since an SLM that could modulate both phase and magnitude would modify only phase at an optimal setting, the optimization problem with only the passivity constraint in Equation 5 is actually equivalent to an optimization problem with a phase-only constraint ($|x_k|=1$). The dual of both of these optimization problems is $$\text{minimize } 1^T \lambda$$

$$\text{subject to } P+\text{diag}(\lambda) \geq 0$$

$$\lambda \geq 0 \quad \text{(Equation 7)}$$

The optimal value of the objective function in Equation 7 provides an upper bound on an achievable minimum distance. This upper bound is used as a metric in developing efficient heuristics as discussed below.

In order to recover more direct information to assist in finding solutions, the dual of the dual problem in Equation 7 is found, which is the standard semidefinite program (SDP):

$$\text{maximize Tr}(PX)$$

$$\text{subject to } X \geq 0$$

$$X_{ii}=1 \quad \text{(Equation 8)}$$

An extension to the SDP-based heuristic algorithm used in the two-way partitioning problem is implemented in certain applications; this heuristic has high computational complexity and assumes knowledge of the channel. In other applications, a single coordinate ascent (SCA) algorithm is implemented with an adaptive hardware implementation. In the following, an example SDP-based heuristic algorithm approach is described. Another example SCA algorithm approach is discussed below in connection with FIG. 3.

In order to extend the two-way partitioning heuristic, the objective function in Equation 5 is revisited by splitting x into its real and imaginary components $x_R$ and $x_I$.

$$(x_R+jx_I)^H P(x_R+jx_I)=x_R^H P x_R + x_I^H P x_I \quad \text{(Equation 9)}$$

The objective function is separable in the real and imaginary components of x, and therefore Equation 5 can be rewritten as $$\text{maximize } z^T \begin{bmatrix} P & 0 \\ 0 & P \end{bmatrix} z \quad \text{(Equation 10)}$$

$$\text{subject } z_k^2 + z_{k+N}^2 \leq 1, k=1, \ldots, N, z \in R^{2N}$$

where $z^T=[x_R^T x_I^T]$. The dual of Equation 10 is the same as Equation 7, but with the positive semidefinite constraint repeated twice. Leaving the redundant constraint in the dual of Equation 10 and forming the dual once more leads to the covariance matrix $$z = \begin{bmatrix} X0 \\ 0X \end{bmatrix}. \quad \text{(Equation 10)}$$

The original covariance matrix X obtained by solving Equation 8 can be used to generate a set of pairs of random vectors ($x_R'$ and $x_I'$) which are independent and identically distributed. To create valid solutions for Equation 5 from these vectors, each component of the vector defined by $x_R'+jx_I'$ is rescaled such that its magnitude is equal to one (i.e., the angle information is preserved); to complete the heuristic the solution that achieves the highest $d_{min}$ is chosen. With this heuristic algorithm approach, solutions very nearly achieve the upper bound on $d_{min}$ calculated from solving Equation 7. In various applications, this approach assumes knowledge of the field patterns of the modes of the fiber via which data is passed.

Figure 3:
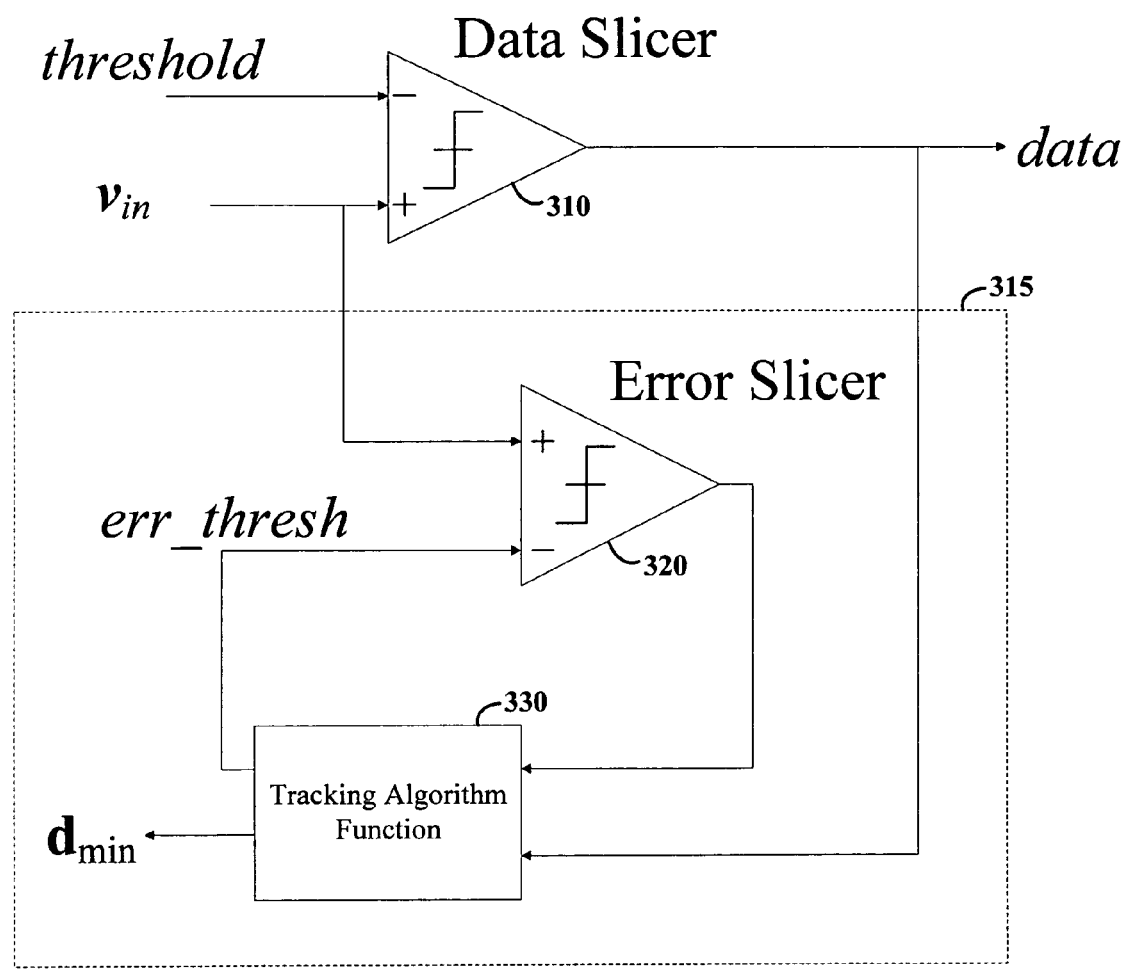
FIG. 3 is an error slicing and tracking arrangement for communicating optical data, according to another example embodiment of the present invention.

FIG. 3 is an error slicing and tracking arrangement 300 for communicating optical data, according to another example embodiment of the present invention. The arrangement 300 may, for example, be implemented in connection with the adaptive algorithm controller 112 in FIG. 1. The arrangement 300 includes a data slicer 310, and a secondary slicer arrangement 315 including an error slicer 320 and a tracking algorithm function 330.

The error slicing and tracking arrangement 300 is implemented with the adaptive algorithm controller 112 in facilitating a single coordinate ascent (SCA) algorithm approach. In this implementation, all of the variables but one are fixed for the SCA algorithm. The current variable (which in this case is the angle of the kth component of x, $\theta_k$) is perturbed in the positive and negative directions by a small step ($\Delta\theta$) and the objective function is measured at all three possible settings ($\theta_k$, $\theta_k+\Delta\theta$, and $\theta_k-\Delta\theta$). The algorithm then simply picks the setting with the highest objective function and moves on to the next variable. For general information regarding SCA algorithms, and for specific information regarding SCA algorithm approaches that may be implemented in connection with one or more example embodiments of the present invention, reference may be made to I. Sharfer and A. O. Hero III, *A maximum likelihood digital receiver using coordinate ascent and the discrete wavelet transform*, IEEE Transactions on Signal Processing, vol. 47, no. 3, pp. 813–825, March, 1999, which is fully incorporated herein by reference.

This algorithm approach is selectively applied with various initial conditions; however, in certain embodiments, the algorithm is applied to a solution generated by an SDP-based heuristic (e.g., with an example application discussed below). Certain applications used in connection with this approach involve a default setting of a spatial light modulator (such as the spatial light modulator 114 of FIG. 1) to focus light onto the center of an optical fiber. The objective function $d_{min}$ (minimum distance between signal levels) at a receiver (e.g., receiver arrangement 130) is measured or estimated and the variable settings are accordingly incremented or decremented. The measurement of $d_{min}$ for this approach is accomplished in one or more of a variety of manners, such as by implementing the secondary slicer arrangement 315, with an adjustable error threshold (err_thresh) set by a tracking loop to the receiver, including the tracking algorithm function 330.

In one implementation, $d_{min}$ is measured for each new SLM setting in the following manner; first, the tracking algorithm function 330 resets the threshold of the error sampler to the highest possible level. Each time that the error slicer 320 indicates that input data is below its threshold and that the data slicer 310 indicates that the input data was above its threshold, the tracking algorithm function 330 lowers err_thresh by a small amount (e.g., by subtracting 1 LSB (least significant bit) from the control code of the DAC (digital-analog converter) that generates err_thresh). At some point, the algorithm reaches a point where no received 1's lie below err_thresh; $d_{min}$ is then calculated from the input to the data slicer 310 threshold and err_thresh. In some applications, this point where $d_{min}$ is calculated is determined by waiting for a period of consecutive bits in which err_thresh is not adjusted downwards. In other applications, this point where $d_{min}$ is calculated is determined by running the tracking algorithm over a fixed number of received bits and then estimating $d_{min}$ from the final err_thresh.

In some applications, negative values of $d_{min}$ are addressed using known training patterns (e.g., a single isolated response) to simplify the measurement of $d_{min}$, for example where the eye is closed with initial SLM settings. The SCA is then selectively applied to open the eye so that $d_{min}$ can be measured from live data.

In certain example embodiments, the size of the SLM array (e.g., the number of pixels in the SLM 114 of FIG. 1) is selected to set the spatial resolution of the field pattern imaged onto the input of a fiber. In some applications, a larger array is implemented to facilitate relatively higher resolution. In connection with certain example embodiments of the present invention, it has been discovered that the performance returns diminish very quickly past an array of size of about 400 pixels. In this regard, once the system has achieved high enough spatial resolution that the field pattern is roughly constant over the entire pixel, further increases in the resolution do not drastically alter the image generated by the SLMs.

In connection with another example embodiment, a 20×20 binary phase SLM is used, balancing tradeoff space between system complexity and performance. In certain applications, such binary phase SLMs are implemented to achieve a $d_{min}$ within about 10% of the $d_{min}$ achieved with 1° resolution.

In another example embodiment of the present invention, multiple communication channels are implemented over a single multimode fiber. Spatial filtering is performed for each channel at a transmitter (to selectively excite the modes assigned to a particular channel) and at a receiver (to filter out light from the other channels). For example, relative to FIG. 1, this approach involves adding a spatial filter at the receiver arrangement 130. In some applications, each channel is assigned its own transmitter with an associated SLM, and light from the (e.g., N parallel) channels can be combined into the fiber without incurring any loss. In certain applications, initialization algorithms are employed to facilitate the selection of a different set of modes by each channel. The system's impulse response is extended to include the spatial filtering performed by receiver SLMs of each channel. In addition, light from one channel that is unfiltered by the receive SLMs of the other channels will cause interchannel interference (ICI). Incorporating these effects, the impulse response from a transmitters to a receiver i is $$I_{out_{ij}}(t) = m_{ij}^H F(t) m_{ij}, \quad \text{(Equation 12)}$$

where $m_{ij} = \text{diag}(\Psi^H x_i^{rx}) \cdot \Psi^H x_j^{tx}$.

The minimum margin of each channel ($d_{min_i}$) is set by both the self-induced ISI and the interchannel interference (ICI) caused by all of the other channels. For example, in a two-channel MIMO system, $$d_{min_i} = [m_{11}^H m_{12}^H] \begin{bmatrix} 2I_{\Delta main1} - I & 0 \\ 0 & -I \end{bmatrix} \begin{bmatrix} m_{11} \\ m_{12} \end{bmatrix} \quad \text{(Equation 13)}$$

Using min $\{d_{min_i}, i=1, \ldots, N\}$ as the objective function, SCA is performed on an example two-channel system, facilitating the mitigation of both ISI and ICI. In some applications, the MIMO system implements two cascaded spatial filters (with efficiencies less than about 1).

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. An optical transmitter for transmitting light in a multi-mode transmission medium, the transmitter comprising:
   a spatial light modulator to perform spatial filtering; and
   a spatial light modulation controller to control the spatial light modulator adaptively and therein mitigate interference in the multi-mode transmission medium.

2. The transmitter of claim 1, wherein the spatial light modulation controller is adapted to control the spatial light modulator as a function of information fed back in response to data carried by the medium.

3. The transmitter of claim 2, wherein the spatial light modulation controller includes a data processing circuit to control the spatial light modulator in response to the information fed back.

4. The transmitter of claim 1, wherein the transmitter is coupled to an optical waveguide medium that communicates data via the light, and the spatial light modulation controller implements an adaptive algorithm for mitigating modal dispersion of the light as a function of an objective parameter indicative of interference of the data communicated by the optical waveguide medium.

5. The transmitter of claim 1, further including an on-off keying modulator for modulating the intensity of the light.

6. The transmitter of claim 1, further including a Fourier lens to provide an optical Fourier transform of the light.

7. The transmitter of claim 1, further including a Fourier lens to provide an optical Fourier transform of the light and an on-off keying modulator to modulate the intensity of the light.

8. The transmitter of claim 1, wherein the transmitter is coupled to an optical waveguide medium that communicates data via the light, and the spatial light modulator and the spatial light modulation controller cooperatively mitigate excitation of undesired modes of the light as a function of an objective parameter indicative of interference of the data communicated over the optical waveguide medium.

9. The transmitter of claim 1, wherein the spatial light modulation controller uses an algorithm in which elements of the spatial light modulator are varied to determine which settings improve an objective function indicative of the interference.

10. An optical data transmission arrangement for transmitting data in the form of light in a multi-mode transmission medium, the arrangement comprising:
    a spatial light modulation arrangement to perform spatial filtering on electric fields of the light; and
    a spatial light modulation controller to control the spatial light modulation arrangement adaptively by implementing an adaptive algorithm for mitigating interference in the multi-mode transmission medium, the adaptive algorithm using an objective parameter indicative of the interference to mitigate excitation of undesired modes of the light.

11. An optical transmitter for transmitting light in a multi-mode transmission medium, the transmitter comprising:
    modulation means for performing spatial filtering; and
    control means for adaptively controlling the modulation means and therein mitigate interference in the multi-mode transmission medium.

12. A method for transmitting light in a multi-mode transmission medium, the method comprising:

using a spatial light modulator for performing spatial filtering; and controlling the spatial light modulator adaptively to mitigate interference in the multi-mode transmission medium.

13. The method of claim 12, wherein the step of controlling the spatial light modulator is a function of an objective parameter indicative of interference of data that is represented by the light and communicated in the multi-mode transmission medium.

14. The method of claim 13, wherein the step of controlling the spatial light modulator includes processing data fed back in response to the data communicated in the multi-mode transmission medium.

15. The method of claim 12, wherein the step of controlling the spatial light modulator includes implementing an adaptive algorithm to mitigate the interference as a function of an objective parameter indicative of interference of data that is represented by the light and communicated in the multi-mode transmission medium.

16. The method of claim 12, wherein the step of controlling the spatial light modulator includes using an algorithm in which elements of the spatial light modulator are varied to determine which settings improve an objective function indicative of the interference.

17. The method of claim 12, wherein the step of controlling the spatial light modulator includes launching the light into the multi-mode transmission medium and concurrently mitigating excitation of undesired modes.

18. The method of claim 12, further including the steps of:
providing an optical-Fourier transform on the light, and focusing the light into a selected set of modes using the spatial light modulator, thereby providing a focused light data signal;
providing an inverse-Fourier transform on the focused light data signal, thereby providing an inverse-Fourier-transformed light data signal; and
launching the inverse-Fourier-transformed light data signal into the multi-mode transmission medium.

19. An optical communication system for communicating light in a multi-mode transmission medium, the system comprising:

a transmitter having a spatial light modulator to perform spatial filtering, and a spatial light modulation controller to control the spatial light modulator adaptively and therein mitigate interference in the multi-mode transmission medium; and a receiver having a photo-detector to receive the light.

20. The optical communication system of claim 19, wherein the spatial light modulation controller controls the spatial light modulator as a function of information fed back in response to data light communicated from the transmitter to the receiver.

21. The optical communication system of claim 20, wherein the receiver provides the information.

22. The optical data communication system of claim 21, wherein the spatial light modulation controller includes a data processing circuit to control the spatial light modulator in response to the information.

23. The optical data communication system of claim 19, wherein the spatial light modulation controller is adapted to perform adaptive spatial filtering on electric fields of the light by implementing an adaptive algorithm for mitigating the interference as a function of objective information that is fed back in response to light communicated from the transmitter to the receiver and that is indicative of the interference.

24. The optical data communication system of claim 19, wherein the spatial light modulation controller is adapted to mitigate the interference by adaptively processing light using the spatial light modulator and using an algorithm in which elements of the spatial light modulator are varied to determine which settings improve an objective function indicative of the interference.

25. The optical data communication system of claim 24, wherein the elements of the spatial light modulator are varied in turn to determine which settings substantially optimize the objective function.

26. The optical data communication system of claim 19, wherein the spatial light modulation controller uses adaptive spatial domain signal processing to mitigate the interference.

* * * * *

UNITED STATES PATENT AND TRADEMARK OFFICE
CERTIFICATE OF CORRECTION

PATENT NO. : 7,194,155 B1  
APPLICATION NO. : 11/201404  
DATED : March 20, 2007  
INVENTOR(S) : Kahn et al.

Page 1 of 1

It is certified that error appears in the above-identified patent and that said Letters Patent is hereby corrected as shown below:

On the Front Page – Item (56) OTHER PUBLICATIONS

The first reference should read: --Alon, E. et al. Equalization of modal dispersion in multimode fiber using spatial light modulators, Global Telecommunications Conference, 2004, GLOBECOM '04, IEEE vol. 2, Nov. 29-Dec. 3, 2004 pp. 1023-1029.*--.

In the Specification

Col. 8, line 57: "subject to $|x_k| \leqq 1$, $k=1,..., N$, $x \in C^N$." should read --subject to $|x_k| \leq 1$, $k=1,..., N$, $x \in C^N$.--.

Col. 8, line 63: "$L(x,\lambda)=x^H (\mathbf{P}+\text{diag}(\lambda)\ x-\lambda^T \mathbf{1}$," should read --$L(x,\lambda)=x^H (\mathbf{P}+\text{diag}(\lambda))\ x-\lambda^T \mathbf{1}$,--.

Col. 9, line 7: "subject to $\mathbf{P}+\text{diag}(\lambda) \geqq 0$" should read --subject to $\mathbf{P}+\text{diag}(\lambda) \geq 0$--.

Col. 9, line 9: "$\lambda \geqq 0$" should read --$\lambda \geq 0$--.

Col. 9, line 20: "subject to $\mathbf{X} \geqq 0$" should read --subject to $\mathbf{X} \geq 0$--.

Signed and Sealed this

Fourteenth Day of April, 2009

JOHN DOLL  
*Acting Director of the United States Patent and Trademark Office*